US008706700B1

(12) United States Patent
Natanzon et al.

(10) Patent No.: US 8,706,700 B1
(45) Date of Patent: Apr. 22, 2014

(54) CREATING CONSISTENT SNAPSHOTS ACROSS SEVERAL STORAGE ARRAYS OR FILE SYSTEMS

(75) Inventors: Assaf Natanzon, Ramat-Gan (IL); Paul Lemahieu, Pasadena, CA (US); Saar Cohen, Moshav-Mishmeret (IL)

(73) Assignee: EMC Corporation, Hopkinton, MA (US)

( * ) Notice: Subject to any disclaimer, the term of this patent is extended or adjusted under 35 U.S.C. 154(b) by 326 days.

(21) Appl. No.: 12/977,251

(22) Filed: Dec. 23, 2010

(51) Int. Cl.
*G06F 17/30* (2006.01)

(52) U.S. Cl.
USPC .................... 707/687; 707/609; 707/648

(58) Field of Classification Search
USPC .................. 707/1/1, 634, 204, 822; 711/162
See application file for complete search history.

(56) References Cited

U.S. PATENT DOCUMENTS

| 7,421,549 B2* | 9/2008 | Watanabe .................... 711/162 |
| 7,624,109 B2* | 11/2009 | Testardi ........................ 1/1 |
| 8,271,441 B1* | 9/2012 | Natanzon et al. ............ 707/634 |
| 2008/0086608 A1* | 4/2008 | Kano .......................... 711/162 |
| 2008/0243952 A1* | 10/2008 | Webman et al. ............. 707/204 |

* cited by examiner

*Primary Examiner* — James Trujillo
*Assistant Examiner* — Thong Vu
(74) *Attorney, Agent, or Firm* — Krishnendu Gupta; Joseph D'Angelo

(57) ABSTRACT

A method, system, and program product for implementing consistent snapshots in a replication environment, the replication environment having a production site having a splitter, and a storage media the method comprising, selecting a set of media from the storage medium, creating a consistency group of the selected set of storage media, creating a journal at the production site, splitting I/O to the consistency group, and recording the split I/O in the journal.

20 Claims, 12 Drawing Sheets

CREATING CONSISTENT SNAPSHOTS ACROSS SEVERAL STORAGE ARRAYS OR FILE SYSTEMS

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data replication.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

A method, system, and program product for implementing consistent snapshots in a replication environment, the replication environment having a production site having a splitter, and a storage media the method comprising, selecting a set of media from the storage medium, creating a consistency group of the selected set of storage media, creating a journal at the production site, splitting I/O to the consistency group, and recording the split I/O in the journal.

DETAILED DESCRIPTION

Figure 1:
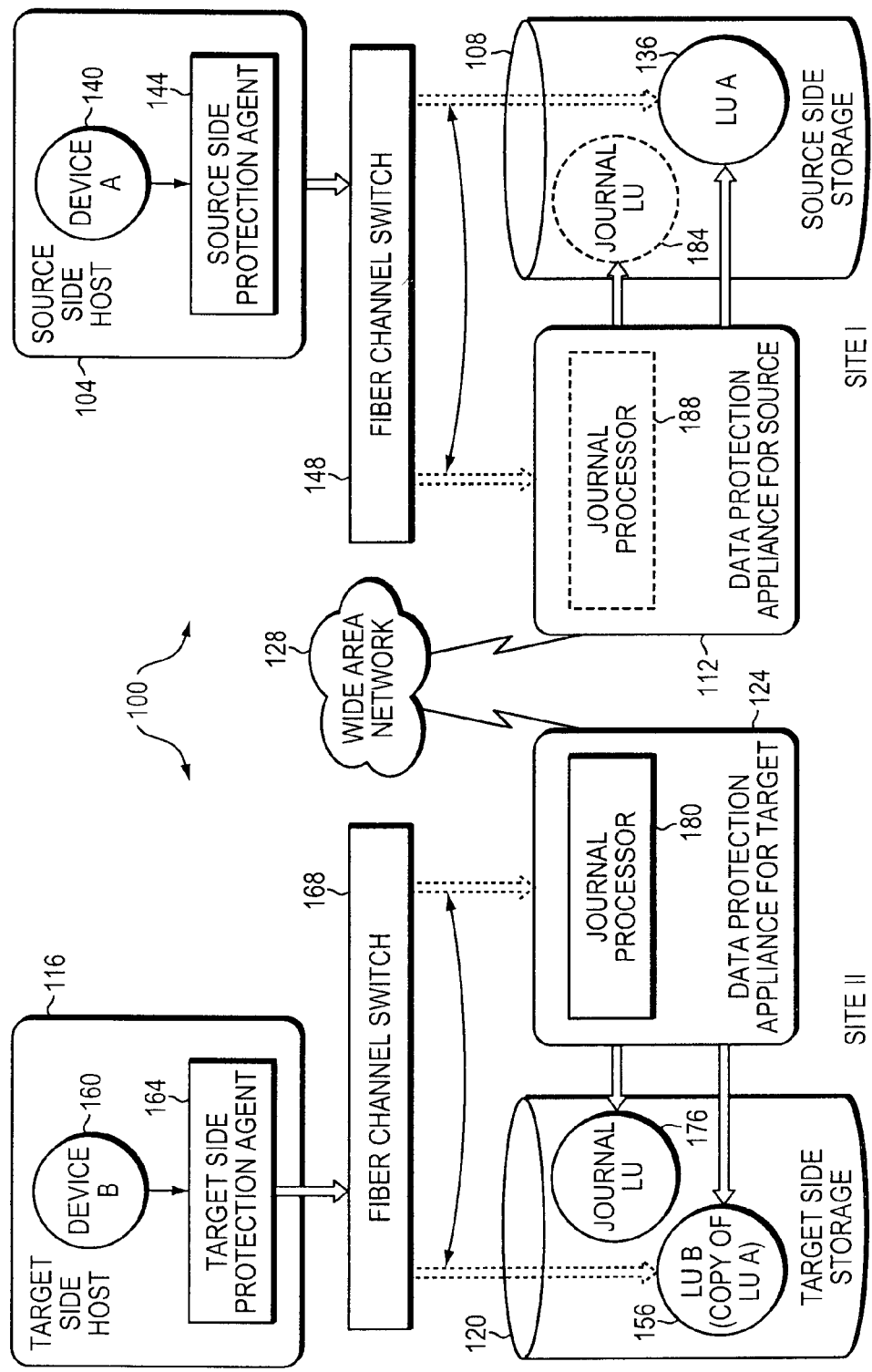
FIG. 1 is a simplified illustration of a data protection system, in accordance with an embodiment of the present invention.

Typically, in order to take a snapshot across several storage devices, either physical or logical, or file systems, it was necessary to quiesing the storage arrays before taking the snapshot. Conventionally, this pause on the production site is noticeable and not scalable. Generally this is because taking a snapshot may take some time in the storage array and a snapshot must be taken for each array in for which the snapshot is requested. In some embodiments, the current disclosure enables non-disruptive snapshots which may be scaled to thousands of volumes In some embodiments, the current disclosure leverages journal based replication to enable consistent snapshots of storage devices or file systems without stopping the IO to these devices. In certain embodiments, a splitter on a production site may splitting the IOs to a recovery appliance. In at least one embodiment, the appliance may write the IOs to a journal. The system may take a snapshot on each volume without any correlation. Once all snapshots have been taken, the journal may be used to roll the snapshots to a common point in time. In further embodiments, it may be possible to make the point in time application consistent by putting the application in consistent mode. The production site may pause the application, take a snapshot, and resume the application. The application may be in hot backup mode for very few milliseconds.

The following definitions are employed throughout the specification and claims.

BACKUP SITE—a facility where replicated production site data is stored; the backup site may be located in a remote site or at the same location as the production site;

CLONE—a clone may be a copy or clone of the image or images, drive or drives of a first location at a second location;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical.

DPA—a computer or a cluster of computers that serve as a data protection appliance, responsible for data protection services including inter alia data replication of a storage system, and journaling of I/O requests issued by a host computer to the storage system;

HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

JOURNAL—a record of write transactions issued to a storage system; used to maintain a duplicate storage system, and to rollback the duplicate storage system to a previous point in time;

LOGICAL UNIT—a logical entity provided by a storage system for accessing data from the storage system;

LUN—a logical unit number for identifying a logical unit;

PHYSICAL STORAGE UNIT—a physical entity, such as a disk or an array of disks, for storing data in storage locations that can be accessed by address;

PRODUCTION SITE—a facility where one or more host computers run data processing applications that write data to a storage system and read data from the storage system;

SAN—a storage area network of nodes that send and receive I/O and other requests, each node in the network being an initiator or a target, or both an initiator and a target;

SOURCE SIDE—a transmitter of data within a data replication workflow, during normal operation a production site is the source side; and during data recovery a backup site is the source side;

SNAPSHOT—a Snapshot may refer to differential representations of an image, i.e. the snapshot may have pointers to the original volume, and may point to log volumes for changed locations. Snapshots may be combined into a snapshot array, which may represent different images over a time period.

STORAGE SYSTEM—a SAN entity that provides multiple logical units for access by multiple SAN initiators TARGET—a node in a SAN that replies to I/O requests;

TARGET SIDE—a receiver of data within a data replication workflow; during normal operation a back site is the target side, and during data recovery a production site is the target side;

WAN—a wide area network that connects local networks and enables them to communicate with one another, such as the Internet.

SPLITTER/PROTECTION AGENT: may be an agent running either on a production host a switch or a storage array which can intercept 10 and split them to a DPA and to the storage array, fail 10 redirect 10 or do any other manipulation to the 10.

A description of journaling and some techniques associated with journaling may be described in the patent titled METHODS AND APPARATUS FOR OPTIMAL JOURNALING FOR CONTINUOUS DATA REPLICATION and with U.S. Pat. No. 7,516,287, which is hereby incorporated by reference.

Description of Embodiments Using of a Five State Journaling Process

Reference is now made to FIG. 1, which is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit.
Redirect the SCSI command to another logical unit.
Split the SCSI command by sending it first to the respective DPA. After the DPA returns an acknowledgement, send the SCSI command to its intended logical unit.
Fail a SCSI command by returning an error return code.
Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 will host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
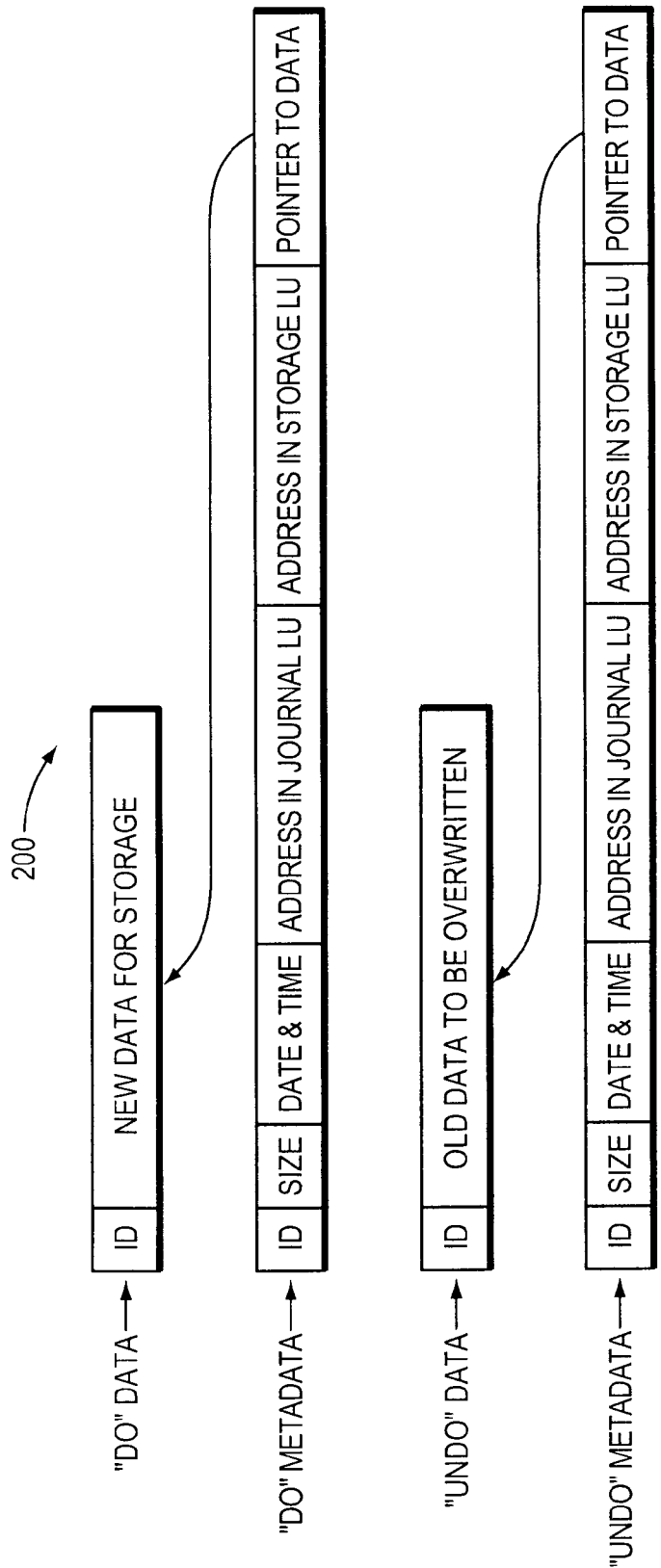
FIG. 2 is a simplified illustration of a write transaction for a journal, in accordance with an embodiment of the present invention.

Reference is now made to FIG. 2, which is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
one or more identifiers;
a time stamp, which is the date & time at which the transaction was received by source side DPA 112;
a write size, which is the size of the data block;
a location in journal LU 176 where the data is entered;
a location in LU B where the data is to be written; and
the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a predefined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Creating Snapshots

In certain embodiments, a user may desire to take a snapshot of a production system, of several file systems or LUNs at a particular point in time across one or more, storage arrays. Typically, to take a snapshot of LUNs, or file systems across several storage arrays, the storage mediums or file systems would need to be stopped or quiesed. Generally, it is not optimal to stop or quiese the storage medium or file system to take a snapshot as it usually takes time to take a snapshot. Thus, conventionally the production system would need to be stopped, snapshots of the desired mediums or file system taken, then the production site would need to be restarted, or an application may be quiesed, but quiesing for too long may cause applications to crash and may not be applicable to many volumes. However, generally it is unacceptable to create such a delay in processing on the production site.

In some embodiments of the current disclosure, snapshots may be taken on a production system is running in production mode. In certain embodiments, a user may select a set of file systems, or a set of LUNs on a production site running across several storage arrays. In certain embodiments, the current disclosure enables taking consistent snapshots across several storage arrays. In some embodiments, the splitters on the production site may begin to split all the IO to the selected mediums, to the DPA, the DPA may record this information in a journal. In some embodiments, there may be only one splitter, in other embodiment there may be multiple splitters. In further embodiments, each array may have a splitter In most embodiments, snapshots of each of these mediums may then be taken. In most embodiments, once the snapshots have been taken, splitting may be stopped to all volumes at the same time (i.e. the DPA may stop writing new data to the journal and drop all new IOs), the journal information may be applied to each snapshot that was taken to roll these snapshots to the same point in time.

In some embodiments, the DPA may write the data to a Do stream ("the journal") as described above. In certain embodiments, after the snapshot is taken the data may be applied to the volumes. In at least some embodiments, data may be read from the beginning of the do stream. In most embodiments, for each IO read if the IO originally was directed to a particular LUN, it may be written to the snapshot of that LUN. In further embodiments, after data is written to the snapshot the data read from the do stream may be erased from the do stream.

In further embodiments, an application consistent point in time of the snapshots may be created. In certain embodiments, the splitters may split the data to the DPA for the volumes or file systems selected to have consistent snapshots taken, the DPA may write the IOs to the journal, and snapshots may be taken on the array for each of the relevant volume or file systems. In some embodiments, the application may quiesed and the splitters may be notified to stop splitting any new IOs, application may resume, the DPA may flush all the IOs to the journal and replay the IO from the journal to the relevant snapshots. In certain embodiments, the application may be in hot backup mode for very few milliseconds when splitter is notified to stop sending new IOs to the DPA. In other embodiments, the DPA may be notified to stop accepting IO from the splitters.

Figure 3:
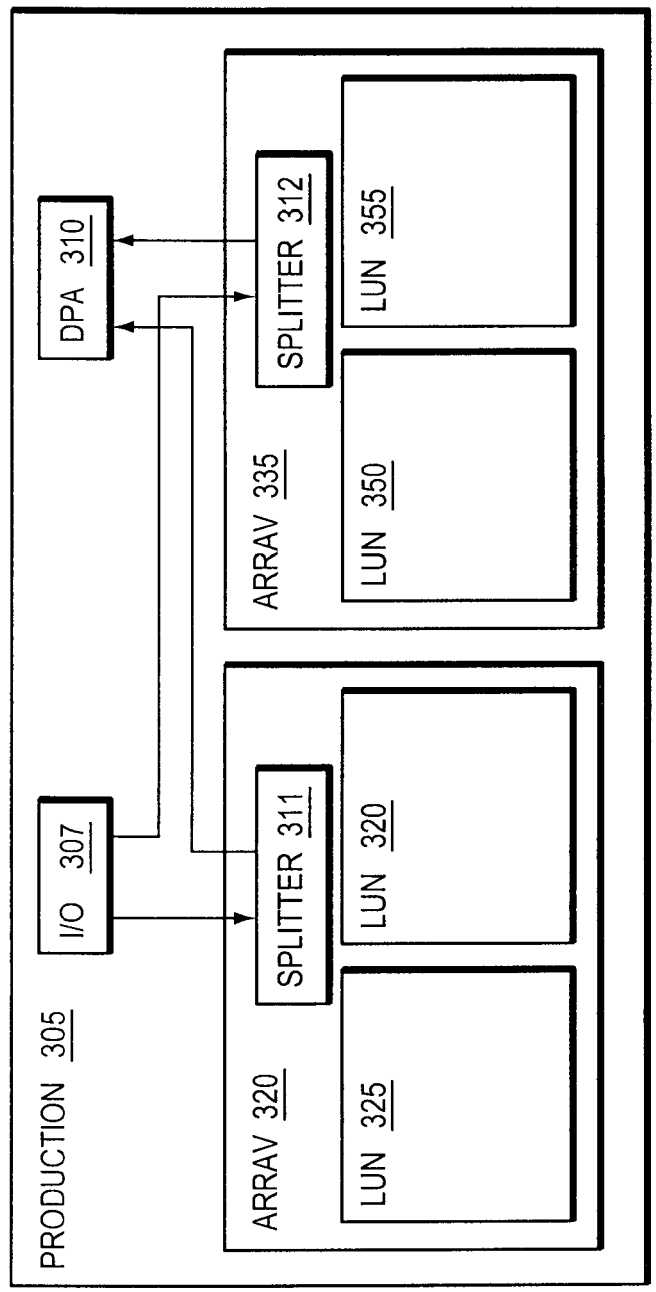
FIG. 3 is an illustration of a simplified illustration of a production site, in accordance with an embodiment of the present invention.
Figure 4:
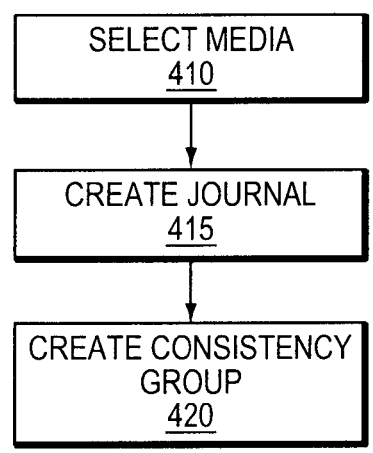
FIG. 4 is a simplified illustration of a method of the current disclosure, in accordance with an embodiment of the present invention.

Refer now to the example embodiments of FIGS. 3 and 4. FIG. 3 represents a simplified example of a production site 305. The production site has data protection appliance (DPA) 310, splitters 311, 312, and arrays 320 and 335. Each array has a set of LUNs, such as LUNs 325 and 320. It may be desired to take a snapshot of 3 LUNs, LUNs 325, 320, and 350. LUNs 325, 320 and 350 may be selected (step 410).

A journal may be created to record all I/O to these LUNs (step 415). A consistency group may be created for these LUNs (step 420). In some embodiments, the DPA may be notified that to create a snapshot across volumes and the DPA may notify the splitter to start splitting all IOs to the 3 volumes. In certain embodiments, there may be a splitter running inside each storage array and the DPA may contact the splitter in each array that has a logical unit or drive which is being replicated.

Figure 5:
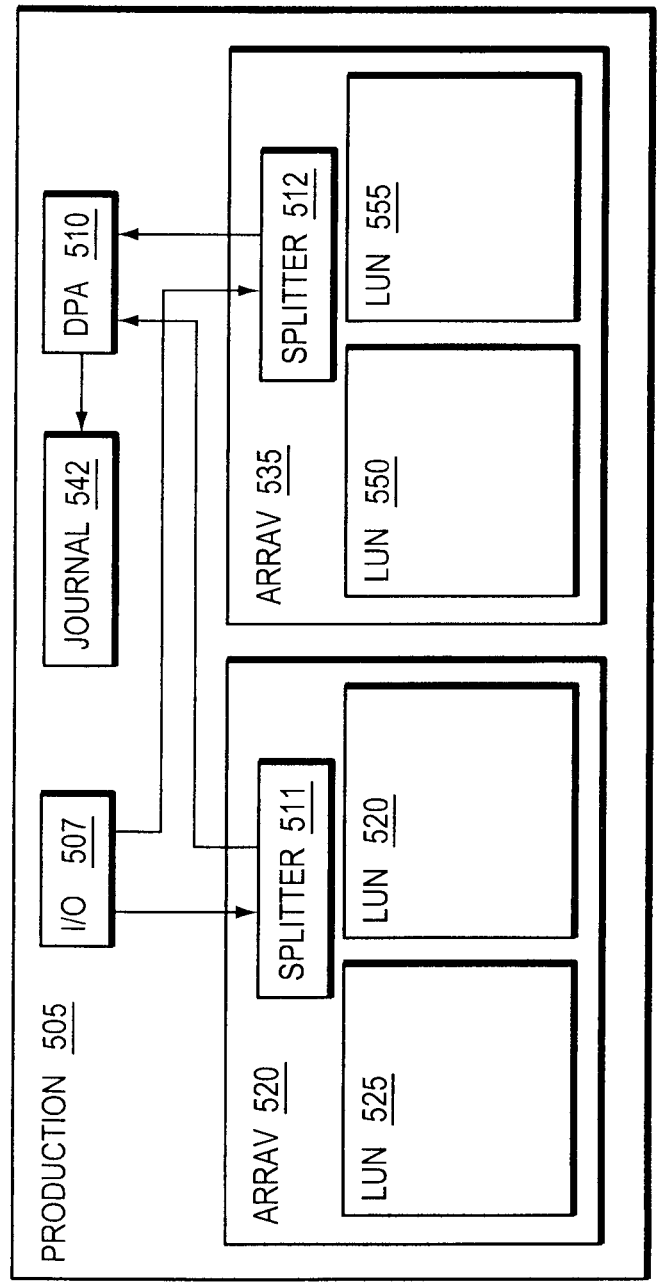
FIG. 5 is an alternative illustration of a simplified illustration of a production site, in accordance with an embodiment of the present invention.
Figure 6:
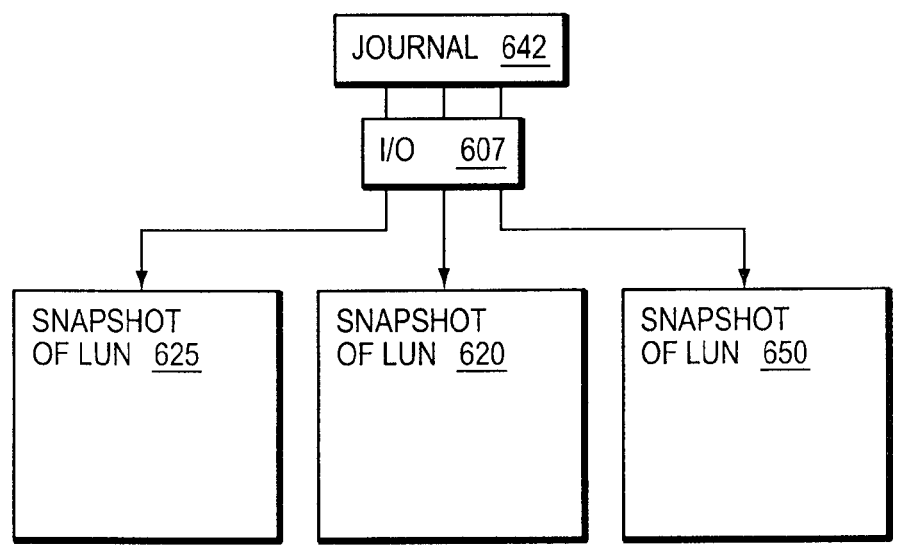
FIG. 6 is a simplified illustration of a journal and snapshots, in accordance with an embodiment of the present invention.
Figure 7:
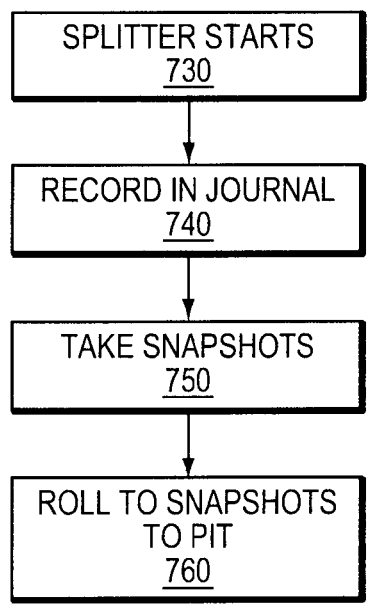
FIG. 7 is an illustration of a simplified method of taking snapshots, in accordance with an embodiment of the present invention.

Refer now to the example embodiments of FIGS. 5, 6, 7. Splitters 511 and 512 may split all I/O 507 addressed to LUNs 525, 520 and 550. The split I/O 507 may arrive at the DPA and the DPA may record the I/O 507 in journal 542. Snapshots of each LUN 525, 520, and 550 are taken (step 750). In these embodiments, the snapshots of the LUNs selected may be taken at any time and may not be taken in any particular order, snapshots may be taken by any storage array snapshot or cloning mechanism such as CLARiiON SnapView, and Symmetrix BCV or Timefinder snapshots. In these embodiments, I/O may be actively be transferred to and from each of the LUNs as the snapshot is occurring. The snapshots 625, 620, and 650 are snapshots of LUNs 525, 520 and 550 at different points in time. Splitting may stop (step 755). Journal 642 may be used to apply I/O 607 to snapshots 625, 620, and 650 to roll each of these snapshots to the same point in time. Following the creation of consistent snapshots the consistency group may be deleted and the journal may be cleared.

Figure 8:
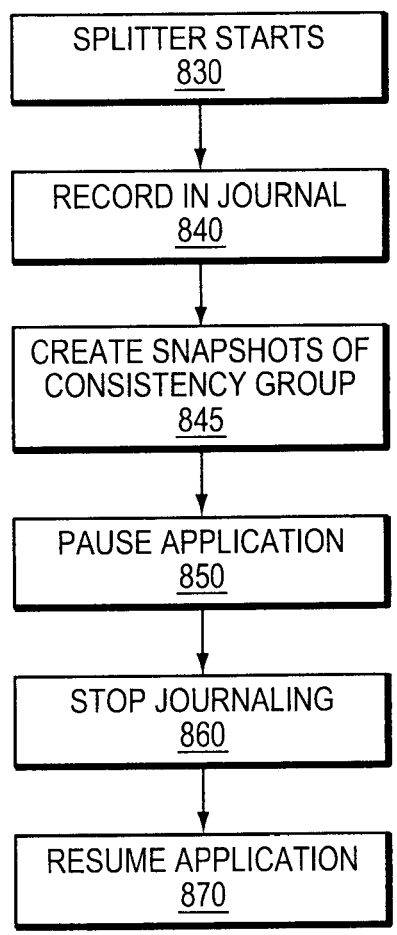
FIG. 8 is an illustration of a simplified method of taking snapshots with application pausing, in accordance with an embodiment of the present invention.

In some embodiments, the applications may be paused momentarily after each individual snapshot is taken. Refer now to the embodiment of FIG. 8. In this embodiment, the applications in the production site may be put in a consistent point in time before the snapshot is created. In the embodiment of FIG. 8, the splitter starts splitting the I/O to the consistency group (step 830). The IIOs are sent to the DPA and the DPA records the IOs in the journal (step 840). A snapshot of each volume may be created independently and on separate time stamps, after snapshots are take for all the volumes (step 845). The application is paused (850). The splitter stops splitting or DPA stops recording new IOs to the journal (step 860). The application is resumed (step 870), IOs which arrived at the DPA are flushed to the journal and IOs are replayed from the journal to the snapshots created (step 880), and an application consistent snapshot may be formed. In certain embodiments, the application may be in hot backup mode for very few milliseconds.

Figure 9:
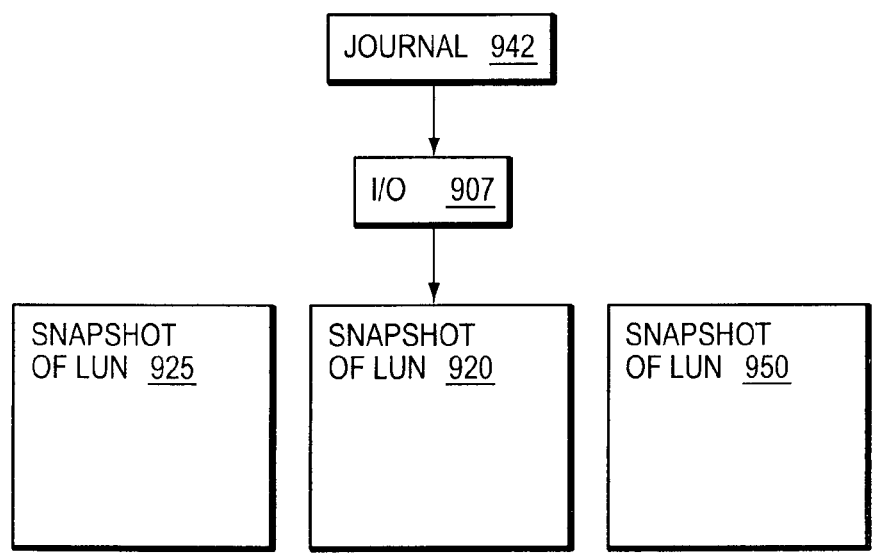
FIG. 9 is an alternative simplified illustration of a journal and snapshots, in accordance with an embodiment of the present invention.
Figure 10:
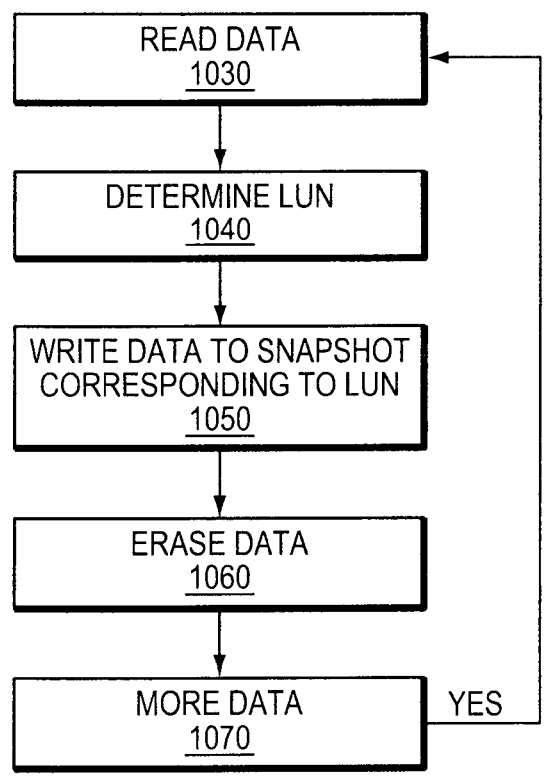
FIG. 10 is an illustration of a simplified method of rolling snapshots to the same point in time, in accordance with an embodiment of the present invention.

Refer now to the example embodiments of FIG. 9 and FIGS. 10. I/O Data 907 may be read from journal 942 (step 1030). It may be determined to what LUN I/O Data 907 was directed (step 1040). In this embodiment, I/O Data 907 may be written to snapshot 920 (step 1050). I/O Data 907 may be erased from journal 942 (step 1060). A determination may be made if there is more I/O Data in journal 942 (step 1070). In some embodiments, if there is more I/O in the journal, the process may repeat. In at least some, if there is no more I/O in the journal, then the journal may be erased.

Figure 11:
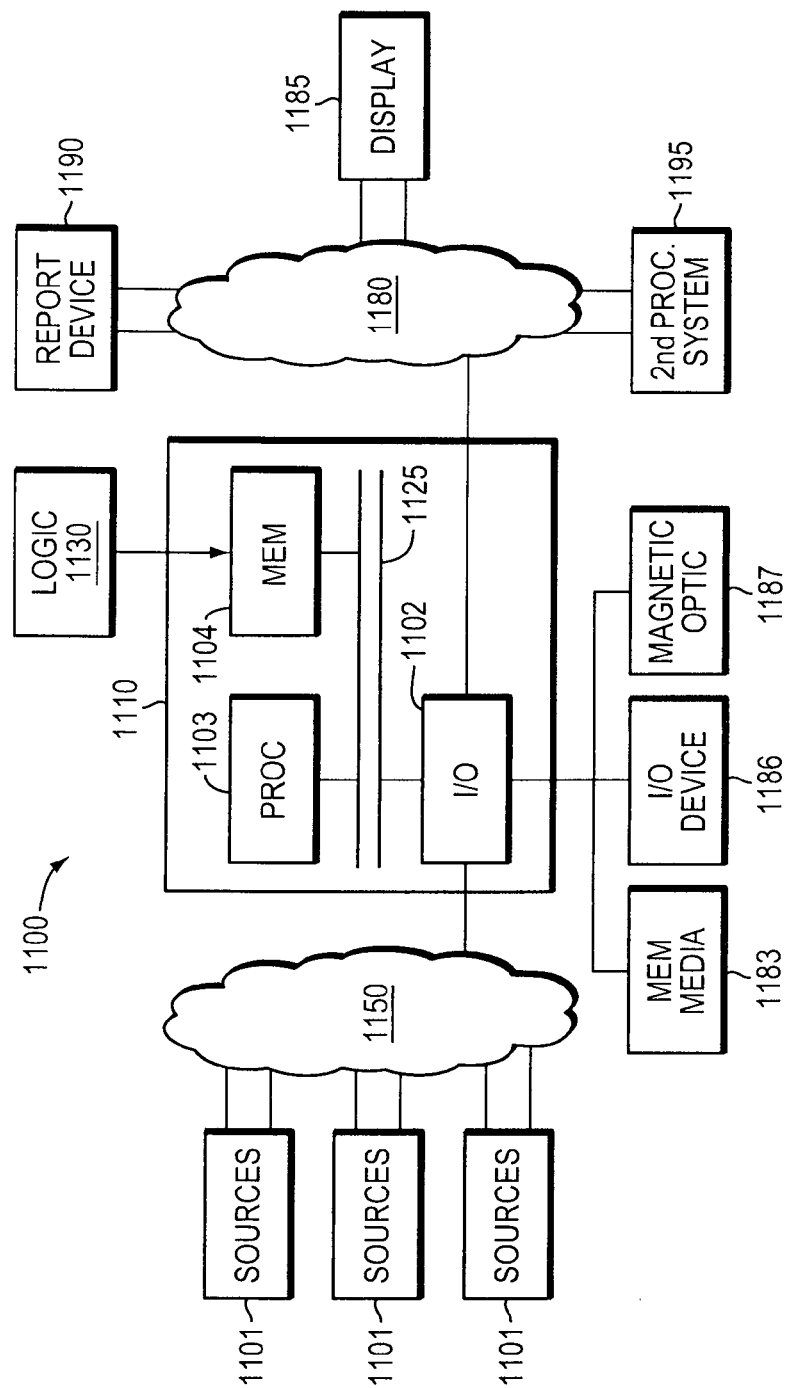
FIG. 11 is an illustration of a computer with program logic, in accordance with an embodiment of the present invention.

The methods and apparatus of this invention may take the form, at least
partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 11, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine.

Figure 12:
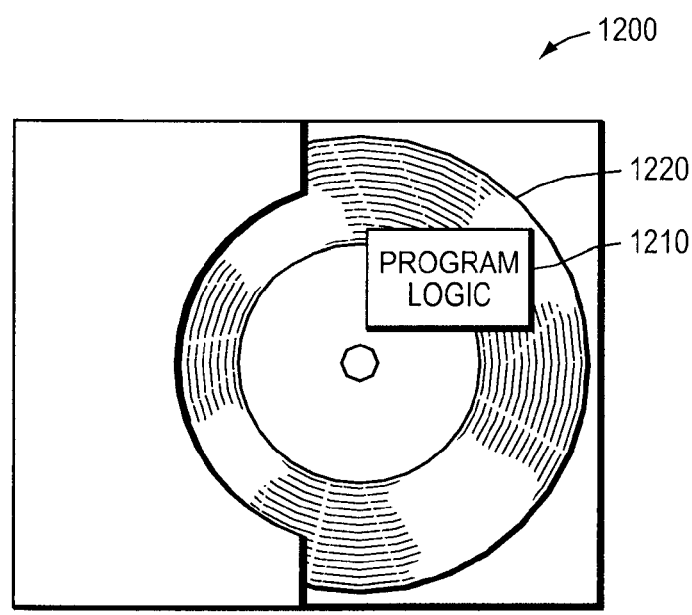
FIG. 12 is an embodiment of the current invention as embodied in program code.

FIG. 12 shows Program Logic 1210 embodied on a computer-readable medium 1230 as shown, and wherein the Logic is encoded in computer-executable code configured for carrying out the reservation service process of this invention and thereby forming a Computer Program Product 1200.

The logic for carrying out the method may be embodied as part of the aforementioned system, which is useful for carrying out a method described with reference to embodiments shown in, for example, FIG. 1 and FIG. 2. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. Thus it may be appreciated that, in addition to data replication systems, the optimal journaling policy of the present invention has widespread application to journaling systems including database systems and version control systems.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method for implementing consistent snapshots in a replication environment, the replication environment having a production site having a splitter, and storage media the method comprising:
   selecting a set of media from the storage media;
   creating a consistency group of the selected set of storage media;
   creating a journal at the production site for recording I/O written to each of the set of media of the consistency group;
   splitting I/O written to the consistency group;
   recording the split I/O for the consistency group in the journal;
   taking a snapshot of each member of the set of the media of the consistency group; wherein IO is enabled to actively be written to each member of the set of the media of the consistency group while the snapshot is taken; and
   stopping splitting IO to the journal; and
   applying a relevant portion of the journal to each snapshot of the each member of the set of the media of the consistency group to bring each snapshot to a same point in time.

2. The method of claim 1 further comprising reading data from the journal.

3. The method of claim 2 wherein the applying a relevant portion of the journal comprises determining to which member of the consistency group the data of the journal was be written.

4. The method of claim 3 wherein the applying a relevant portion of the journal further comprising writing the data of the journal to the snapshot corresponding to the member of the consistency group to which the data was written.

5. The method of claim 4 further comprising determining if there is more data in the journal.

6. The method of claim 1 further comprising quiesing one or more applications running in the replication environment.

7. The method of claim 1 wherein the set of storage media span storage arrays.

8. The method of claim 1 wherein the set of storage media encompass a selection of file systems.

9. The method of claim 1 wherein applications writing to the consistency group are put in an application consistent state before a snapshot is taken.

10. A computer program product comprising:
a non-transitory computer readable medium encoded with computer executable program code for implementing consistent snapshots in a replication environment, the replication environment having a production site and a splitter, the production site having storage mediums, the code enabling:
selecting a set of media from the storage mediums;
creating a consistency group of the selected set of storage media;
creating a journal at the production site for recording I/O written to each of the set of media of the consistency group;
splitting I/O written to the consistency group;
recording the split I/O for the consistency group in the journal;
taking a snapshot of each member of the set of the media of the consistency group; wherein IO is enabled to actively be written to each member of the set of the media of the consistency group while the snapshot is taken; and
stopping splitting IO to the journal; and
applying a relevant portion of the journal to each snapshot of the each member of the set of the media of the consistency group to bring each snapshot to a same point in time.

11. The program product of claim 10 wherein the code further enables reading data from the journal.

12. The program product of claim 10 wherein the applying a relevant portion of the journal comprises determining to which member of the consistency group the data of the journal was be written.

13. The program product of claim 10 where the applying a relevant portion of the journal further comprises writing the data of the journal to the snapshot corresponding to the member of the consistency group to which the data was written.

14. The program product of claim 10 wherein the code further enables determining if there is more data in the journal.

15. The program product of claim 10 wherein the code further enables quiesing one or more applications running in the replication environment.

16. A system for implementing consistent snapshots in a replication environment, the system comprising:
a production site;
a splitter;
storage mediums, and
computer-executable logic operating in memory, wherein the computer-executable
program logic is configured to enable a processor to execute:
selecting a set of media from the storage mediums;
creating a consistency group of the selected set of storage media;
creating a journal at the production site for recording I/O written to each of the set of media of the consistency group;
splitting I/O written to the consistency group;
recording the split I/O for the consistency group in the journal;
taking a snapshot of each member of the set of the media of the consistency group; wherein IO is enabled to actively be written to each member of the set of the media of the consistency group while the snapshot is taken; and
stopping splitting IO to the journal; and
applying a relevant portion of the journal to each snapshot of the each member of the set of the media of the consistency group to bring each snapshot to a same point in time.

17. The system of claim 16 wherein the logic further enables reading data from the journal.

18. The system of claim 16 wherein the applying a relevant portion of the journal comprises determining to which member of the consistency group the data of the journal was be written.

19. The system of claim 16 wherein the applying a relevant portion of the journal further comprises writing the data of the journal to the snapshot corresponding to the member of the consistency group to which the data was written.

20. The system of claim 16 wherein the logic further enables determining if there is more data in the journal.

* * * * *